GAME OF CHANCE

Original Filed Oct. 23, 1969

INVENTOR.

Henry E. Lippert

United States Patent Office

Re. 28,108
Reissued Aug. 6, 1974

28,108

GAME OF CHANCE

Henry E. Lippert, 130 SW. 12th, Miami, Fla. 33130

Original No. 3,633,915, dated Jan. 11, 1972, Ser. No. 868,782, Oct. 23, 1969. Application for reissue Aug. 3, 1973, Ser. No. 385,259

Int. Cl. A63f *3/00*

U.S. Cl. 273—130 H 1 Claim

Matter enclosed in heavy brackets [ ] appears in the original patent but forms no part of this reissue specification; matter printed in italics indicates the additions made by reissue.

ABSTRACT OF THE DISCLOSURE

A table-type betting game that simulates gambling on races at a horse or dog track. The game includes an Amount of Bet circle, a number of Odds Discs, and a Bank. An indicator, rotated over the bet circle, determines the amount of a player's wager. The Bank is always the eventual winner, due to specially designed Odds Discs. Each disc is divided into segments of varying sizes, and each segment carries a betting odd, the reciprocal of each of the betting odds being greater than the corresponding segment's proportional share of the periphery of the disc. The discs are interchangeable, and each disc represents one game or "race." An arrow rotated over an odds disc determines the winning player and the odds he receives.

This invention relates to that type of game that can be played by participants sitting around a table, and it is thought that the game is interesting entertainment and a good pastime.

The game was designed to be similar to gambling at a racing establishment. Variable wagers and a variety of returns on a wager are embodied in this game. It is believed that a palyer of the game gets to feel that he is doing the same thing he does at a race track.

The game might also teach a lesson or have an educational feature associated with it, because all the players end up losers, after continuous or extended play. The winning player must be considered as the one who loses the least amount of his original stake.

*A Bank, that is a part of the game, is the eventual winner. When the game is terminated, the assets of the Bank are divided equally among the players.*

Figure 1:
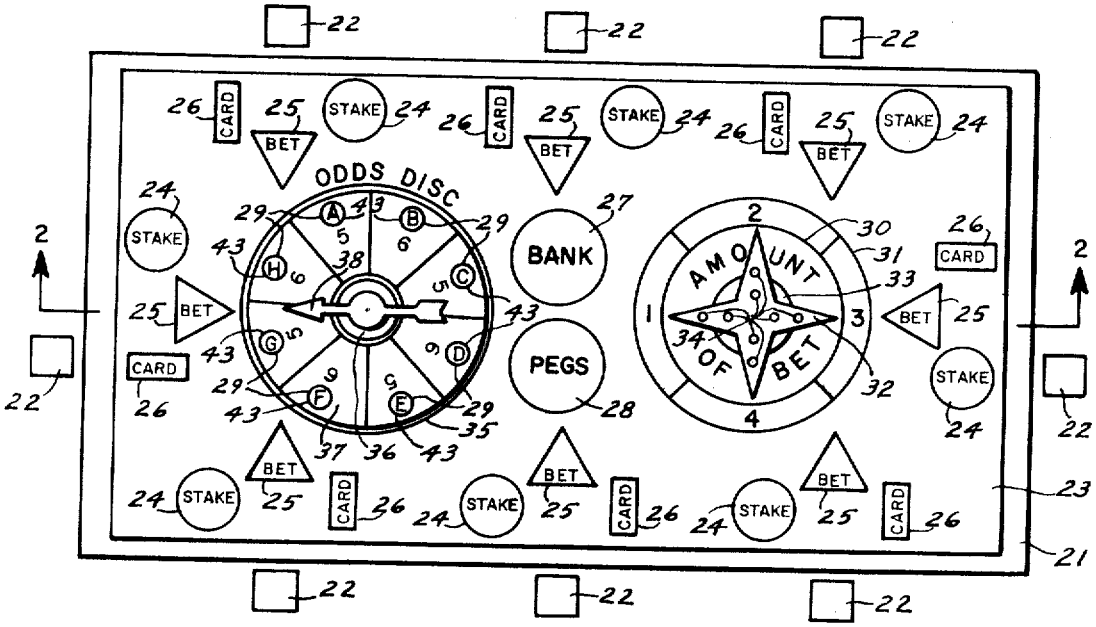
FIG. 1 is a plan view of the game as it would appear laid out on a table.

Referring to the drawing, forming a part hereof, the numeral 21 designates a table, around which eight players are seated. The players are represented by squares and the numeral 22. Eight players are used because the odds discs were designed for that many players, and each player can have a different selection or choice, which is explained later.

The numeral 23 represents a piece of plastic, cardboard or cloth, rectangular in shape, and spread out over the table. Printed on the cloth 23, in front of each player, is a circle 24, a triangle 25 and a rectangle 26, containing the words Stake, Bet and Card, respectively. Printed on the cloth 23, near the center portion thereof, are two circles 27 and 28, having therein the words Bank and Regs, respectively. Eight pegs, designated as a whole by numeral 29, normally reside in the Pegs circle when not in use. These pegs 29 are described later.

Printed on the cloth, to the right of the Bank circle 27, are two larger concentric circles 30 and 31. The space between circles 30 and 31 is divided into four equal parts. Each of these four parts has a different number printed therein, the numbers being from one to four, inclusive. The inner circle 30 contains the words Amount of Bet. A four pointed rotatable indicator 32 is mounted in a base 33 that sits in the middle of circle 30. Eight holes 34 are provided in the indicator 32, two holes in each of the four points, and these holes are adapted to receive pegs 29.

Figure 2:
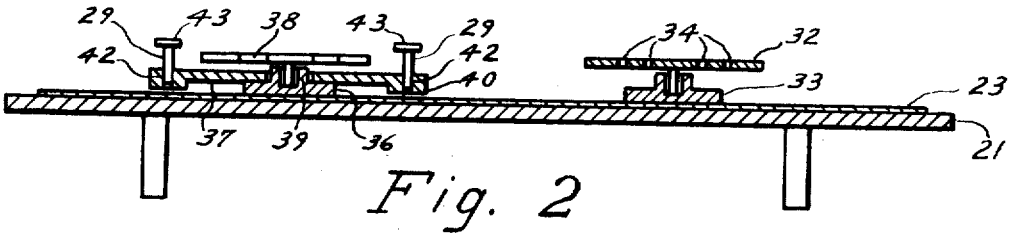
FIG. 2 is a vertical section taken on line 2—2 of FIG. 1.

To the left of the Bank circle 27 is a larger circle 35, and printed on the cloth 23, beside circle 35, are the words Odds Disc. In the center of circle 35 is a base 36, adapted to receive a disc 37 and a rotatably mounted arrow 38. The disc 37 fits over a hub 39 on the base 36, and rests on the base, as can be seen in FIG. 2.

Figure 3:
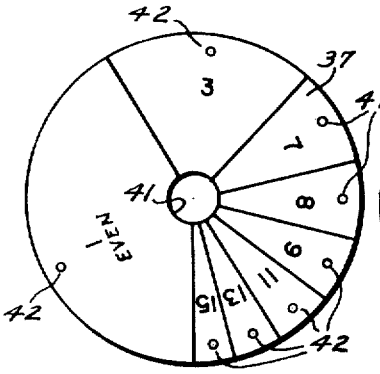
FIGS. 3, 4 and 5 are plan view illustrations of odds charts or discs used in this game.
Figure 4:
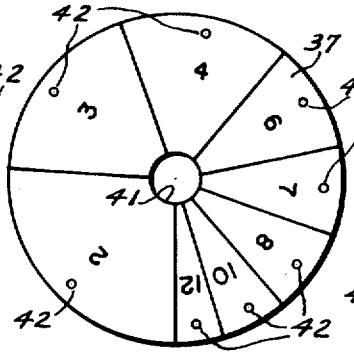

The disc 37 is slightly smaller in diameter than the circle 35, and is one of a number of discs supplied with the game. These discs have a reinforced outer edge 40, and a center opening 41. Each disc is divided into eight sements, each segment representing one of the odds or prices on a contestant or choice. Such division of each disc is of a different design or pattern, as is apparent in FIGS. 3, 4 and 5. Each division or segment of each disc carries a number. In the present game it was considered best to use eight numbers on each disc, selected from a set of numbers from 1 to 15, inclusive. These numbers represent values or odds, the odds that a winner receives on his bet.

Figure 5:
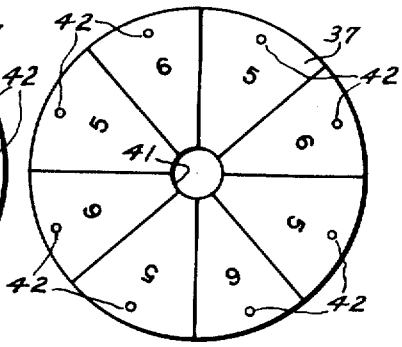

In FIG. 5 the odds are all within one point of each other, as when contestants of a race are about equal. The odds on the discs are like the approximate odds at a race track. Since the odds discs are an important contributing feature of the game, how they are created is essential. One method is to establish in a circle eight arcs or eight segments, and then provide appropriate odds printed in the segments. Conversely, another method is to first establish a logical set of odds for a disc, and then divide the disc into appropriately sized segments. The elimination of fractional odds on the discs was preferred, to simplify making payoffs, and for this and other reasons, the present discs were developed using a combination of both methods stated above. The average reduction in payoff returns was made about 15 percent, in designing the discs. The value of the reciprocal of each odd is greater than its segment's proportional part of the periphery of the disc.

To briefly illustrate the explanation in the foregoing paragraph, and with reference to FIG. 5, the arcs were established first, and odds Five appears in a 49° segment, and the odds Six occurs in a 41° segment. Conversely, in FIG. 3, where the odds were established first, the arc of the even money segment, 1 to 1, was made less than one-half the circle. Such special features of design, used in creating the discs, is what makes the Bank the eventual winner.

For complete clarity, the matter described in the two preceding paragraphs may be set forth mathematically, as follows: The reciprocal of the Odd is a greater fraction than the ratio of the area of its segment to the area of the circle. Hence, it also follows that the reciprocal of the Odd is a greater fraction than the ratio of the length of its arc to the circumference of the circle.

Near the outer edge of each disc, and opposite or beside each segment on the disc, is a small hole 42 adapted to receive one of pegs 29. The pegs are outside the range of arrow 38. Each peg has a head 43 sufficiently large to receive a letter stamped thereon, and the letters range from "A" to "H," inclusive.

Before the game begins, one player is named the banker, and he gives each player 50 chips and puts four hundred chips in the Bank. The 50 chips each player receives is placed in his respective Stake circle. Most of the successive steps of the game may be done by prearranged agreement, such as, one player starting and each player taking his turn in clockwise order.

A set of eight cards, not shown, is supplied with the game, and the cards are lettered "A" to "H," inclusive. The cards are shuffled and each player draws or is dealt a card, and he places it, face up, in his respective Card rectangle. The main purpose of the cards is to eliminate the possibility of a player later forgetting the letter on his peg. The cards or pegs are the indicia from which an original selection is made or given to each player.

Each player now takes a peg from the Pegs circle, and the peg he gets must have the same letter thereon as the letter on his card. Each player now puts his peg in one of the eight holes indicator 32. The indicator 32 is spun by one of the players, to determine how much each player shall bet. The minimum bet is one chip and the maximum bet is four chips, depending on where the indicator 32 stops in the Amount of Bet circle. The maximum bet is limited because of the relative size of the Bank. As soon as a player knows the amount of his bet, he places that sum in his Bet triangle, and there it remains until a winner has been decided. The arrow 38 is lifted from its base 36, one of the Odd Discs is put in place on the base, and the arrow 38 is replaced. The player with the card lettered "A" now chooses the odds he wants, and puts his peg in the disc edge hole 42 that is beside the odds he chooses. The player with the card lettered "B" selects the odds he wants, from the seven odds remaining, and puts his peg in the edge hole 42 beside the odds be chooses. This continues, each player taking his turn, and selecting from the odds remaining. The player with the card lettered "H" takes the last odds remaining, and puts his peg in the only open edge hole left.

One of the players now spins arrow 38, and the player at whose peg the arrow stops is the winner. He is paid by banker according to the amount he bets and the odds he chose. The banker collects all the other bets and puts the sum in the Bank. A player's winnings are added to his Stake circle.

We are ready to begin another "race" or game. The second game proceeds in the same manner as the first described game, except that a different Odds Disc is used. The playing continues until all of the discs have been used, or until the end of a preset time period. When the playing ends, the winner of the complete game is that player who has the most chips remaining in his Stake circle.

Variations of this game can easily be made. If there are only seven players available, one player can take two cards and make two bets, etc. If there are only four players, each player can take two cards and make two bets. Another variation would be to design Odds Discs having seven divisions, for seven players; or six division for six players, etc.

Any player who "goes broke" before the end of the time period can borrow from the Bank, in order to remain in the game. A record is kept of the chips borrowed, and an accounting is made at the end of the game.

One evening's play at the present game is about equal to a week's experience at a race track, that is, in number of "races" or games played.

I claim:

1. Game apparatus comprising a playing board having indicia thereon designating an area for use as a bank; a plurality of members to be drawn by chance or choice and each bearing a different one of a series of indicia; means for selecting by chance or choice one of said series of indicia; a circular member having its surface divided into segments of different peripheral extents, each segment bearing a different one of a set of indicia representing betting odds, the reciprocal of each odd being greater than its segment's proportional part of the periphery of said circular member; and means for effecting relative rotary movement of said circular member and a coacting index member to select by chance one of said segments.

References Cited

The following references, cited by the Examiner, are of record in the patented file of this patent or the original patent.

UNITED STATES PATENTS

| | | | |
|---|---|---|---|
| 1,382,435 | 6/1921 | McCoy | 273—130 H |
| 1,407,223 | 2/1922 | Rose | 273—130 H |
| 1,592,877 | 7/1926 | Western | 273—141 R |
| 1,752,089 | 3/1930 | Hynes | 273—141 R |

FOREIGN PATENTS 372,312 4/1923 Germany.

DELBERT B. LOWE, Primary Examiner

U.S. Cl. X.R.

273—136 R, 141 R